United States Patent Office 3,573,109
Patented Mar. 30, 1971

3,573,109
PRODUCTION OF METAL RESISTANT TO NEUTRON IRRADIATION
Ira S. Levy, Kennewick, Wash., assignor to the United States of America as represented by the United States Atomic Energy Commission
No Drawing. Filed Apr. 24, 1969, Ser. No. 819,527
Int. Cl. C22f 1/10; C21b 7/14
U.S. Cl. 148—11.5       9 Claims

ABSTRACT OF THE DISCLOSURE

A process is disclosed for producing a metal which is highly resistant to damage by neutron irradiation. Austenitic stainless steels or nickel-base alloys, which also contain suitable carbide-formers such as niobium (columbium), titanium, tantalum, or zirconium, are subjected to a series of thermal and mechanical treatments, namely:

(1) solution heat treatment at a temperature sufficiently high to place in solid solution substantially all the dissolvable carbides,
(2) quenching at a controlled rate,
(3) plastic deformation at or near room temperature, and
(4) plastic deformation at high temperature.

CONTRACTUAL ORIGIN OF THE INVENTION

This invention was made in the course of or under a contract with the United States Atomic Energy Commission.

BACKGROUND

In nuclear reactors, metals are subject to high-temperature neutron irradiation and consequent damage. This is true of both structural materials and those forming the cladding of the nuclear fuel elements. It is particularly severe in the latter case. The development of "fast" reactors (i.e., those in which neutronic energies are not significantly reduced by moderation) intensifies this problem, because of the high neutron flux characteristic of such reactors and the high kinetic energy of the neutrons. Whereas materials of "thermal" reactors (i.e., those in which the neutrons are moderated to thermal velocities) may be subject to a fluence (integrated flux) of $10^{21}$ fast neutrons (defined as those neutrons having energies of at least 0.1 mev.) per square centimeter, fast power reactors, are expected to subject some of the materials to fast fluences of at least $10^{24}$ n./cm.$^2$.

Recent studies have shown that a complex damage state is produced in metals subjected to a fast neutron fluence in excess of $10^{22}$ n./cm.$^2$. For example, in AISI 304 stainless steel irradiated at about 530° C. to a fast fluence of $1.4 \times 10^{22}$ n./cm.$^2$, the damage was observed to comprise sessile loops about 400 A. in diameter and $3.7 \times 10^{15}$/cm.$^3$ in density, with polyhedral cavities approximately 150 A. in diameter and about $2 \times 10^{14}$/cm.$^3$ in density. The loops result from the production and clustering of interstitials; the cavities apparently grow from irradiation-produced vacancy clusters that have been stabilized by the helium generated by $n, \alpha$ reactions with alloy elements. (See Holmes et al., Acta Metallurgica, vol. 16, p. 955, 1968.)

The reference just cited and other studies show that the defect structure affects mechanical behavior in at least two important ways. First, the loops and cavities contribute to substantial hardening and resulting embrittlement, with complete recovery of strength occurring only on subsequent annealing at high temperature. Secondly, the cavities result in substantial swelling of the metal. A volume increase of 1.2% has been observed in AISI 304 stainless steel after a fast neutron fluence of $4.8 \times 10^{22}$ cm.$^2$ at 507° C. and 7% in AISI 316 stainless steel after $7.8 \times 10^{22}$ n./cm.$^2$ at 510° C. As previously stated, fluences of 10 to 100 times these values are expected in fast power reactors. Some recent studies suggest that the swelling may reach 500% at $10^{24}$ n./cm.$^2$. (See Holmes et al., Trans. Amer. Nuclear Society, vol. 11, No. 2, p. 479, November 1968.)

The lower fast fluences ($<10^{21}$ n./cm.$^2$) that are achieved in thermal reactors produce a different type of damage, characterized by small defect clusters which are more easily annealed and by helium-filled bubbles.

Because of the differences in the type of damage involved in fast reactors, different expedients must be adopted to avoid such damage. Some experiments on the swelling behavior of austenitic stainless steels have shown that AISI 347 steel (18% Cr; 8% Ni; 1% Nb) and AISI 321 (18% Cr; 8% Ni; 1% Ti) suffer significantly less (½ to ⅒ respectively) swelling than does AISI 304 (18% Cr; 8% Ni). Irradiation was at a temperature $>660°$ C. in a fast neutron flux to fluences of $1.8$–$2.7 \times 10^{22}$ n./cm.$^2$. (See Comprelli et al., Trans. Amer. Nuclear Soc., vol. 11, No. 2, p. 479, November 1968.) The swelling was, however, probably not sufficiently reduced when a goal fast fluence of $10^{24}$ n./cm.$^2$ is considered.

Similar problems exist with nickel-base alloys. These alloys of the nickel-chromium-iron type have been found to form voids at even lower fluences than the stainless steels. This is true, for example, of Inconel 600, which is about 70% nickel, 18% chromium, and 7% iron.

SUMMARY OF INVENTION

I have devised a process for increasing the resistance of austenitic stainless steels and nickel-base alloys to neutron irradiation, particularly in fast reactors, and for providing thermal stabilization. The object of the series of steps is to provide: (1) a highly dense array (of the order of $10^{13}$/cm.$^3$) of large (of the order of 50,000 A.) stacking faults in the matrix upon which are precipitated, (2) a large number (of the order of $10^{16}$/cm.$^3$) of very small (of the order of 50 A.) carbide precipitates, and (3) areas around the grain boundaries which are denuded of such a structure.

The steel or nickel-base alloy must contain, in addition to carbon, small quantities of appropriate carbide-formers such as niobium (columbium), titanium, tantalum, or zirconium, such that face-centered cubic MC-type carbides will form that have a lattice spacing similar to, but somewhat greater than, the matrix, thereby producing matrix lattice strains. The metal is first subjected to solutioning at a temperature and for a time to incorporate a significant proportion of these carbides into solid solution. The metal is quenched from solution at a rate slow enough that a significant number of stacking-fault nucleating sites, i.e., dislocations, are not produced around grain boundaries, leaving the boundaries free of faults and, thus more ductile than the matrix. The metal is then subjected to small amounts of plastic strain to accelerate the formation of a large number of stacking faults by increasing the number of nucleating sites, i.e., dislocations. It is next subjected to plastic strain in the temperature range of 600° to 750° C. to cause sufficient diffusion of the carbide-former to existing precipitates, so that they will continue to grow and increase the rate of growth of the stacking fault. It is then air-cooled to room temperature.

The structure produced is highly resistant to radiation damage.

The stacking faults represent virtual sumps for irradiation-produced vacancies (in terms of calculable sinks) and, thereby, reduce the swelling and high temperature hardening caused by voids because:

(1) The faulted areas provide sufficient interstitials to annihilate vacancies accounting for about 0.7% of the swelling.

(2) The MC carbides attract vacancies, to relieve the volume expansion strains associated with their growth, that account for up to 0.3% of the swelling.

(3) The high density of small, closely spaced, particles ($\sim 1 \times 10^{16}/cm.^3$ 50 A. particles) also act as sinks for vacancies in a manner similar to the efficient defect-precipitate interaction observed in low-fluence studies.

(4) The faults themselves form extremely small "cells" whose dimensions (interfault distance $<0.5\mu$) favor vacancy migration to them relative to void formation, thereby reducing swelling and high-temperature hardening.

(5) Precipitate clusters (up to 5000 A.) found within the matrix area of the "cell" reduce some vacancy-sink distances.

The precipitates on the stacking-faults are quite resistant to significant further growth and, therefore, produce good thermal stability. A useful degree of as-treated high-temperature ductility results from the stacking fault-free zones around the grain boundaries.

DETAILED DESCRIPTION

Stainless steel

As stated earlier, this invention is applicable to austenitic stainless steels containing a carbide-forming additive such as niobium (columbium), titanium, tantalum, or zirconium. Such steels may range, by weight, from 18 to 25% chromium, 7 to 40% nickel, 0.5 to 2% of the carbide-former and 0.05 to 0.2% carbon, in a ratio of approximately 10:1 carbide-former to carbon. The presently preferred alloy is AISI 348 stainless steel, containing, by weight, approximately 18% Cr, 10% Ni, 0.6% Nb, and 0.06% C.

Other suitable steels are AISI 347 (18% Cr; 8% Ni; 0.8% Nb; 0.08% C), and AISI 321 (18% Cr; 10% Ni; 0.4% Ti; 0.04% C).

The steel is first heated to a temperature sufficiently high to place in solid solution substantially all the dissolvable carbides. The presently preferred conditions are one hour at 1300° C.

The metal is then cooled at a controlled rate which should be not greater than 100° C./sec. Preferably, it is much less—about 2° C./sec.

The steel is subjected to plastic deformation. In the preferred embodiment, this is carried out at room temperature, but any temperature in the range from room temperature to 700° C. may be used. Any type of plastic deformation may be employed. The preferred method will depend on the particular shape of the metal to be treated and, depending on that shape, may involve either tension or compression. A strain of at least 1% should be given; however, to avoid subsequent production of stacking faults around grain boundaries, an upper limit of about 5% is recommended.

At a temperature in the range 600° C. to 750° C., preferably about 700° C., it is again subjected to plastic deformation by placing it under tension. A recommended technique is to subject it to a stress somewhat above its proportional elastic limit for that temperature, but less than its ultimate strength. It is held under this stress and temperature for a short period of time, e.g., one-half hour, such that the highest density of stacking faults is achieved concomitant with retention of desired ductility.

The steel is then air-cooled.

EXAMPLE I

AISI 348 stainless steel is heated to 1300° C. and held at that temperature for one hour. It is then cooled at 2° C./sec. to room temperature, placed under tension and given a strain of about 3%. Next it is heated to 700° C. and held at that temperature for one-half hour under a tensile stress of about 18,000 lb./sq. in. It is then air-cooled.

High-nickel alloys

The nickel-base alloys of the nickel-chromium-iron series (defined as including at least 40%, by weight, of nickel) are modified by including the same carbide formers, i.e, niobium (columbium), titanium, zirconium, or tantalum, together with carbon in the same proportions as in the stainless steels. A preferred alloy has the approximate composition, by weight, 60% nickel, 18% chromium, 20% iron, 1% niobium, and 0.1% carbon. The temperatures and strains utilized are also the same. Since, however, the proportional elastic limits for these alloys at high temperatures are greater than for the stainless steels, the stresses are correspondingly higher.

EXAMPLE II

An alloy which is 60% nickel, 18% chromium, 7% iron, 1% niobium and 0.1% carbon is heated to 1300° C. for one hour. It is quenched at 2° C./sec. to room temperature, placed under tension and subjected to a strain of 3%. It is then held at 700° C. under a tensile stress of 25,000 lb./sq. in., after which it is air-cooled to room temperature.

The embodiments of the invention in which an exclusive property or privilege is claimed are defined as follows:

1. A method of producing a metal highly resistant to neutron irradiation damage comprising subjecting a metal selected from the group consisting of austenitic stainless steels and nickel-base alloys of the nickel-chromium-iron series, said metal also containing carbon and a carbide-former selected from the group consisting of niobium (columbium), titanium, zirconium, and tanlatum, the carbide-former constituting from 0.5 to 2% of the alloy, and the ratio, by weight, of carbide-former to carbon being substantially 10:1, to the following series of steps:

(a)) heating said alloy at a temperature sufficiently high and for a time sufficiently long to place in solid solution substantially all the dissolvable carbides;
    (b) cooling to substantially room temperature at a rate not greater than 100° C. per second;
    (c) prestraining the metal to the extent of 1% to 5% at a temperature in the range of room temperature to 700° C.;
    (d) heating said metal for an extended period of time at a temperature in the range 600° C. to 750° C. while subjecting it at that temperature to a stress above the proportional elastic limit, but below its ultimate strength; and
    (e) allowing said metal to cool to room temperature.

2. A method as defined in claim 1, wherein said metal is an austenitic stainless steel containing 18 to 25% chromium, 7 to 40% nickel, 0.5 to 2% carbide-formers and 0.05 to 0.2% carbon.

3. A method as defined in claim 2, wherein the steel contains substantially 18% chromium, 10% nickel, 0.6% niobium, and 0.06% carbon.

4. A method as defined in claim 1, wherein:
    (a) the solution heat treating step comprises holding the metal at a tempertaure of substantially 1300° C.;
    (b) the cooling is carried out at substantially 2° C. per second;
    (c) The prestraining step comprises straining the metal substantially at room temperature to the extent of 1% to 5%; and
    (d) the straining is carried out at a temperature of substantially 600° to 700° C. for substantially one hour.

5. A method as defined in claim 3, wherein:
    (a) the solution heat treatment is carried out at substantially 1300° C. for substantially one hour;
    (b) the cooling is carried out at a rate of substantially 2° C./sec.;
    (c) the prestraining is carried out substantially at room temperature to the extent of substantially 3%; and (d) the straining is carried out at a temperature of substantially 700° C. for substantially one hour under a stress of substantially 18,000 lb./sq. in.

6. A method as defined in claim 1, wherein said metal is a nickel-base alloy containing at least 40% nickel, the balance being predominately chromium and iron.

7. A method as defined in claim 4, wherein said metal is a nickel-base alloy containing at least 40% nickel, the balance being predominately chromium and iron.

8. A method as defined in claim 6, wherein said nickel-base alloy contains substantially: 60% nickel, 18% chromium, 20% iron, 1% niobium, and 0.1% carbon.

9. A method as defined in claim 8, wherein:
(a) the solution heat treatment is carried out at substantially 1300° C. for substantially one hour;
(b) the cooling is carried out at a rate of substantially 2° C./sec.;
(c) the prestraining is carried out substantially at room temperature to the extent of substantially 3%; and
(d) the straining is carried out at a temperature of substantially 700° C. for substantially one hour under a stress of substantially 25,000 lb./sq. in.

References Cited
UNITED STATES PATENTS

| | | | |
|---|---|---|---|
| 2,027,554 | 1/1936 | Schafmeister et al. | 148—12.3 |
| 3,347,715 | 10/1967 | Pfeil | 148—12.3 |
| 3,473,973 | 10/1969 | Maekawa et al. | 148—12.3 |

L. DEWAYNE RUTLEDGE, Primary Examiner
W. W. STALLARD, Assistant Examiner

U.S. Cl. X.R.
148—12, 12.3